United States Patent
Dutau

(10) Patent No.: US 9,537,360 B2
(45) Date of Patent: Jan. 3, 2017

(54) ROTOR COMPRISING INTERPOLAR REGIONS WITH COOLING CHANNELS

(71) Applicant: MOTEURS LEROY-SOMER, Angouleme (FR)

(72) Inventor: Alexis Dutau, Angouleme (FR)

(73) Assignee: MOTEURS LEROY-SOMER, Angoulene (FR)

( * ) Notice: Subject to any disclaimer, the term of this patent is extended or adjusted under 35 U.S.C. 154(b) by 159 days.

(21) Appl. No.: 14/350,176

(22) PCT Filed: Oct. 4, 2012

(86) PCT No.: PCT/IB2012/055328
§ 371 (c)(1),
(2) Date: Apr. 7, 2014

(87) PCT Pub. No.: WO2013/050957
PCT Pub. Date: Apr. 11, 2013

(65) Prior Publication Data
US 2014/0252894 A1    Sep. 11, 2014

(30) Foreign Application Priority Data
Oct. 6, 2011  (FR) ..................... 11 59043

(51) Int. Cl.
*H02K 9/00*    (2006.01)
*H02K 9/06*    (2006.01)
*H02K 1/20*    (2006.01)
*H02K 1/32*    (2006.01)

(52) U.S. Cl.
CPC ............... *H02K 1/20* (2013.01); *H02K 1/325* (2013.01)

(58) Field of Classification Search
CPC ............... H02K 3/24; H02K 9/20; H02K 1/32
USPC ........................................ 310/58, 59, 61, 52
See application file for complete search history.

(56) References Cited

U.S. PATENT DOCUMENTS

| | | | |
|---|---|---|---|
| 5,140,204 A * | 8/1992 | Cashmore | H02K 9/20 310/214 |
| 7,598,635 B2 | 10/2009 | Howard et al. | |
| 2007/0090701 A1 * | 4/2007 | Down | H02K 3/527 310/51 |
| 2012/0126643 A1 * | 5/2012 | Zhong | H02K 1/32 310/59 |

FOREIGN PATENT DOCUMENTS

| | | | | |
|---|---|---|---|---|
| EP | 0 881 757 A1 | 12/1998 | | |
| GB | 2 425 662 A | 11/2006 | | |
| GB | 2425662 A | * 11/2006 | ............... H02K 1/32 |

(Continued)

OTHER PUBLICATIONS

May 28, 2013 International Search Report issued in International Application No. PCT/IB2012/055328 (with translation).

(Continued)

*Primary Examiner* — Jose Gonzalez Quinones
(74) *Attorney, Agent, or Firm* — Oliff PLC

(57) ABSTRACT

The invention relates to a rotor for a rotary electric machine, extending along a longitudinal axis and including: an assembly of electrical sheets forming projecting poles, two projecting poles defining an interpolar region therebetween; and at least two internal cooling channels formed in the assembly of electrical sheets in at least one interpolar region.

10 Claims, 2 Drawing Sheets

(56) References Cited

FOREIGN PATENT DOCUMENTS

Figure 1:
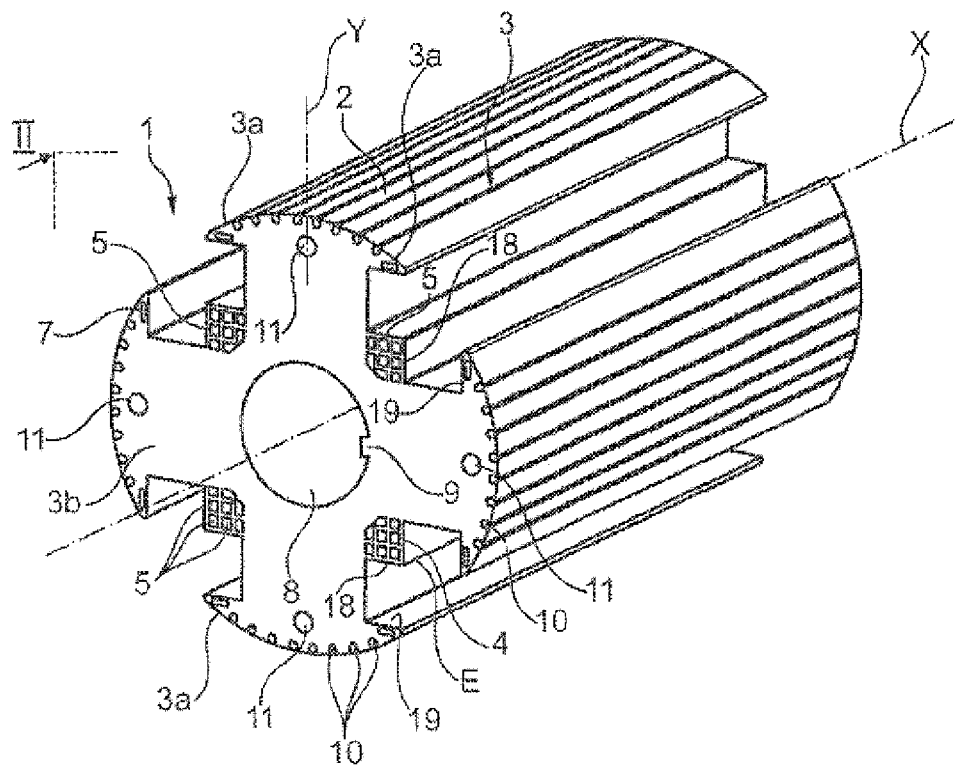

GB         2 432 728 A    5/2007
JP      A-2001-339883    12/2001

OTHER PUBLICATIONS

May 28, 2013 Written Opinion issued in International Application No. PCT/IB2012/055328 (with translation).
May 10, 2012 French Search Report issued in French Application No. FR 1159043 (with translation).
May 10, 2012 French Written Opinion issued in French Application No. FR 1159043 (with translation).

* cited by examiner

ROTOR COMPRISING INTERPOLAR REGIONS WITH COOLING CHANNELS

BACKGROUND

The subject of the present invention is a rotor for an electrical rotating machine, and a machine comprising such a rotor.

The present invention applies more particularly but not exclusively to the cooling of the rotor of open, single-phase or polyphase electrical rotating machines having a rotation speed of, for example, between 0 and 10,000 revolutions per minute, and a power of, for example, between 0.1 and 25 MW.

RELATED ART

"Open electrical rotating machine" means a machine cooled by a flow of air drawn from outside the machine.

In order to cool a rotor, it is known practice to arrange cooling channels in the rotor.

It is notably known practice to produce a channel close to the bottom of the interpolar space.

Document GB 2,425,662 discloses the production of a cavity in the metal sheet at the bottom of the interpolar spaces.

Moreover, U.S. Pat. No. 7,598,635 discloses the production of the metal sheets in which a channel is arranged close to the bottom of the interpolar space, this channel allowing the passage of a coolant for cooling the rotor.

There is a need to further improve the cooling of a rotor of an electrical rotating machine.

SUMMARY

The object of the invention is to respond to this need and it achieves this object, according to one of its aspects, by virtue of a rotor for an electrical rotating machine extending along a longitudinal axis, comprising:
- an assembly of magnetic sheets forming salient poles, two salient poles defining between them an interpolar region, and
- at least two internal cooling channels formed in the assembly of magnetic sheets in at least one interpolar region, better each interpolar region.

The invention makes it possible to improve the thermal performance of the machine and to reduce the heating of the rotor windings for a given volume of copper.

The presence of several internal channels makes it possible to increase the surface area of heat exchange and to significantly improve the coefficients of heat exchange.

"Internal channel" means a channel with a closed contour.

The invention also makes it possible to reduce the maximum temperature of the electrical conductors and of the insulators for a given volume of copper, which increases reliability and to reduce the overall cost of the machine, by virtue of reducing the quantity of active material at identical thermal states compared with a known machine.

In the rest of the description, the cooling fluid is preferably air, but the invention is not limited to air as the cooling fluid.

The rotor allows the cooling fluid to flow along the channels.

Depending on the desired cooling of the rotor, a greater or a lesser number of internal cooling channels, for example between 3 and 15 channels, runs through each interpolar region.

The various cooling channels may be defined between fins arranged in each interpolar pole region.

The fins may extend over all or some of the length of the rotor. In particular, the fins may be interrupted and the interpolar region then has a dentate shape. The convection exchanges are increased because of the increase in the average coefficient of heat exchange. This dentate shape may be cleverly obtained by stacking identical metal sheets in packs placed in a staggered manner by alternating the front and back faces of the packs.

The fins may be placed in various ways within the interpolar regions.

The cooling channels may run through the whole length of the rotor. The cooling channels may run through the rotor continuously or noncontinuously along the longitudinal axis of the latter.

When the cooling channels are discontinuous, the interpolar regions have a dentate shape defining teeth. The cooling channels are then arranged in these teeth. Such a configuration allows the cooling fluid to undergo an alternation of passageways inside the channels and of passageways in widened zones extending axially between the channels. This makes it possible to generate a certain turbulence favorable to the convection exchanges. Moreover, the cooling fluid can flow transversely between the teeth.

Each interpolar region may have a cut-out section, due to the cooling channels running through it, representing more than 25% of its total section.

The salient poles each comprise a pole body and two pole shoes (also called "pole tips").

At least one cooling channel may be arranged in the pole shoes of the salient poles in order to further improve the cooling of the rotor. In this way it is possible to obtain, for each pole, a flow of cooling fluid within the interpolar regions, and a flow within the pole shoes.

Each magnetic sheet may be in one piece. All the sheets of the rotor may be identical, each sheet having salient poles that have only one pole shoe, all the shoes being directed in the same circumferential direction. When the rotor is assembled, the sheets are assembled in packs.

The rotor may comprise tie-rods for axial compression of the assembly of magnetic sheets.

The rotor may comprise, at the radially outer end of the pole body, housings for receiving dampers.

The rotor may comprise end-plates in order to make the operation of winding easier and to improve the general mechanical strength of the rotor.

A further subject of the invention, according to another of its aspects, is an electrical rotating machine comprising a rotor as defined above.

The electrical rotating machine comprises a stator inside which the rotor rotates.

The machine may comprise one or more fans, which may or may not be driven by the rotor, in order to create a flow of forced air in the various cooling channels.

The invention will be better understood on reading the following description of non-limiting exemplary embodiments of the latter and on examining the appended drawing in which:

BRIEF DESCRIPTION DRAWINGS

Figure 2:
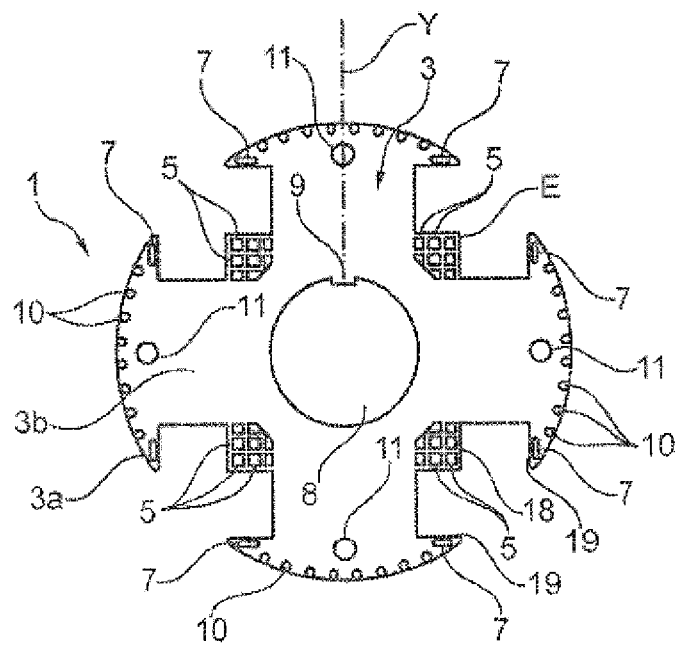
Figure 3:
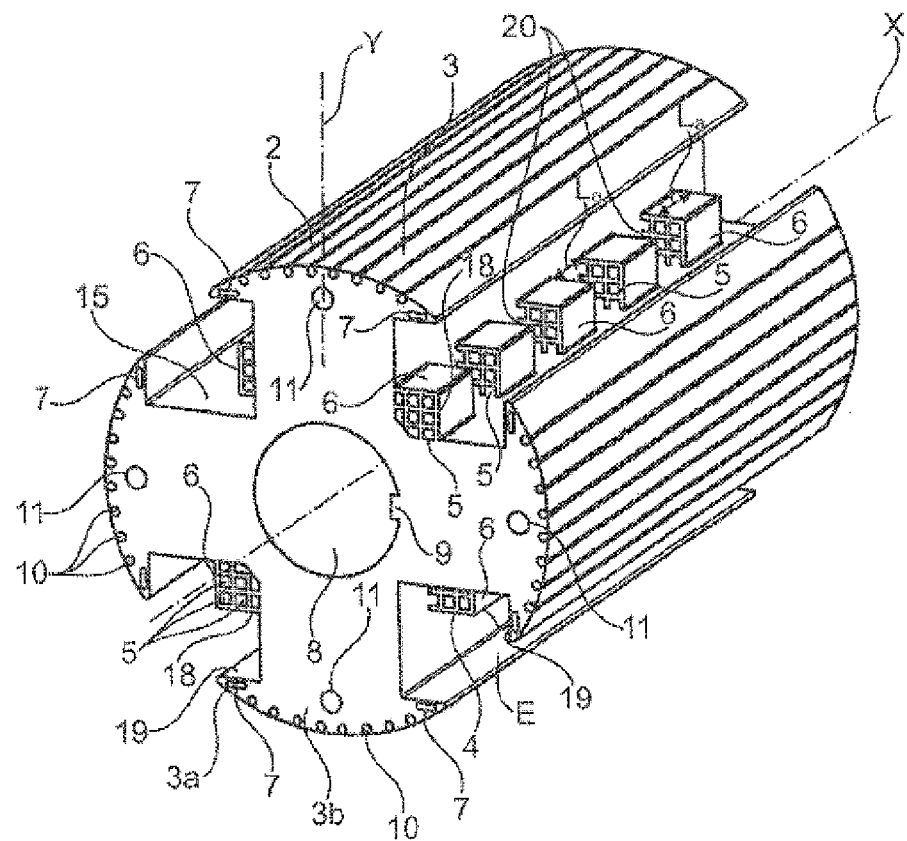
Figure 4:
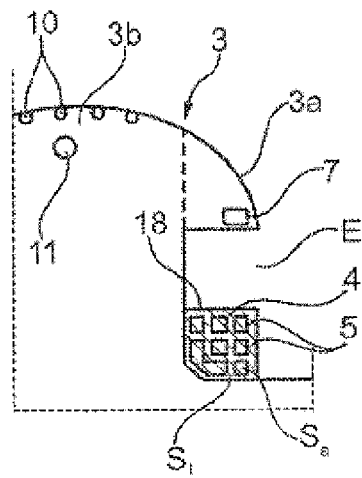

FIG. 1 is a schematic and partial perspective of an example of a pack of magnetic sheets of a rotor according to the invention, FIG. 2 is a front view along II of FIG. 1, FIG. 3 is a view similar to FIG. 1 of another example of a pack of magnetic sheets of a rotor according to the invention, and FIG. 4 represents in isolation and partially a salient pole and an interpolar region according to an exemplary embodiment of the invention.

DETAILED DESCRIPTION OF INVENTION

FIG. 1 shows a first example of magnetic mass of a rotor 1 which extends along a longitudinal axis X and comprises an assembly of magnetic sheets 2, forming salient poles 3, being four in number in the example illustrated, the invention not however being limited to a particular polarity.

As can be seen in FIG. 1, each pole 3 comprises a pole body 3b, which extends along a center line Y, and two pole shoes 3a which protrude in the circumferential direction.

Two adjacent poles 3 define between them an interpolar region E.

Electrical conductors are wound around each pole 3 and define windings not shown.

Each metal sheet is preferably in one piece being cut out from one and same magnetic band.

The rotor 1 may comprise tie-rods not shown for retaining the assembly of magnetic sheets 2 passing through the rotor mass by virtue of openings 11 situated on the poles 3.

A central housing 8, furnished with an anti-rotation means 9, is arranged in the pack in order to receive a shaft not shown.

The magnetic mass of the rotor 1 may also comprise, as illustrated, housings 10 for receiving dampers not shown.

According to the invention, at least two internal cooling channels 5 run axially through each interpolar region E, for example seven channels, as illustrated in FIGS. 1 and 2.

Fins 4 placed in the interpolar regions E separate the various cooling channels 5.

The cooling channels 5 are for example made in an extension 18 in the form of a right angle, with sides parallel to the faces 19 opposite the pole shoes 3a.

In the example of FIGS. 1 and 2 the cooling channels 5 run through the whole length L of the rotor 1 continuously without interruption.

The magnetic mass may be formed by the stacking of identical magnetic sheets, an additional cooling channel 7 being able to be formed by cutting out the metal sheet within the pole shoes 3a. Several additional channels 7 may be arranged within the pole shoes 3a.

In the variant illustrated in FIG. 3, the interpolar regions E each have a dentate shape defining teeth 6, being five in number per interpolar region E in the example described, the invention however not being limited to a particular number of teeth.

The cooling channels 5 are arranged in the teeth 6, and the gap 20 between the teeth 6 defines a passageway of widened section for the cooling fluid.

The axial dimension $L_a$ along the axis X of a tooth 6 is for example equal to the dimension $L_e$ of the gap 20 between two teeth 6.

Advantageously, the interpolar regions E advantageously have no teeth at one of their axial ends, for example the end 15, as shown in FIG. 3.

Each interpolar region E has a total section $s_t$, shown with hatched lines in FIG. 4, and a cut-out section $s_a$ defined by the cooling channels 5 running through the interpolar region E. The cut-out section $s_a$, preferably represents more than 25% of the total section $s_t$ of the interpolar region E.

The channels 5 may have different sections within one and the same interpolar region E.

In order to obtain the configuration illustrated in FIG. 3, where the interpolar channels are discontinuous, it is possible to use identical magnetic sheets which are assembled in packs with a thickness $L_a$ and placed in a staggered manner with, in the four-pole example illustrated, a reversal of the packs in order to make the regions with channels and those without channels alternate.

The rotor 1 is for example incorporated into an electrical rotating machine, not shown, comprising a centrifugal fan. As a variant, the fan is a multi-channel fan. In yet another variant, the fan is made by placing in series a centrifugal fan and an axial fan.

The air aspirated by the fan passes through the cooling channels 5 that are present in the interpolar regions E situated between two adjacent salient poles 3. Moreover, the air can circulate in the air gap and through the channels 7 arranged in the pole shoes 3a of the salient poles 3.

The invention is not limited to the examples that have just been described.

It is possible for example to combine the features described with reference to various embodiments within variants that are not illustrated.

The fins 4 may be of any shape.

The invention may be applied to rotors with fitted pole shoes. The invention is not limited to particular salient poles.

The expression "comprising one" must be understood to be synonymous with "comprising at least one", unless the contrary is specified.

The invention claimed is:

1. A rotor for an electrical rotating machine, extending along a longitudinal axis, comprising:
    an assembly of magnetic sheets forming salient poles, two salient poles defining between them an interpolar region, and
    at least two internal cooling channels formed in the assembly of magnetic sheets and integrally formed therewith in at least one interpolar region, a cooling fluid flowing along said internal cooling channels,
    the assembly of magnetic sheets comprising a stacking of identical magnetic sheets one in contact with the other.

2. The rotor as claimed in claim 1, the magnetic sheets being identical and in one piece.

3. The rotor as claimed in claim 1, from 3 to 15 internal cooling channels being formed in each interpolar region.

4. The rotor as claimed in claim 1, the cooling channels being separated within each interpolar region by fins.

5. The rotor as claimed in claim 1, the cooling channels making the whole length of the assembly of magnetic sheets of the rotor.

6. The rotor as claimed in claim 1, the cooling channels being placed continuously along the longitudinal axis of the rotor.

7. The rotor as claimed in claim 1, the interpolar regions each having a dentate shape defining teeth.

8. The rotor as claimed in claim 1, each interpolar region having a cut-out section representing more than 25% of its total section.

9. An electrical rotating machine comprising a rotor as claimed in claim 1.

10. An electrical rotating machine comprising a fan, and a rotor extending along a longitudinal axis and comprising:
    an assembly of magnetic sheets forming salient poles, two salient poles defining between them an interpolar region, and at least two internal cooling channels formed in the assembly of magnetic sheets and integrally formed therewith in at least one interpolar region, the air aspirated by the fan passing through said internal cooling channels, the assembly of magnetic sheets comprising a stacking of identical magnetic sheets one in contact with the other.

\* \* \* \* \*